United States Patent
Najd et al.

(10) Patent No.: US 9,428,275 B2
(45) Date of Patent: Aug. 30, 2016

(54) INSTALLATION SYSTEM FOR AFT AIRCRAFT MONUMENT ASSEMBLY

(71) Applicant: C&D ZODIAC, INC., Huntington Beach, CA (US)

(72) Inventors: Nabih Najd, Huntington Beach, CA (US); Harry Ta, Huntington Beach, CA (US)

(73) Assignee: C&D ZODIAC, INC., Huntington Beach, CA (US)

( * ) Notice: Subject to any disclaimer, the term of this patent is extended or adjusted under 35 U.S.C. 154(b) by 0 days.

(21) Appl. No.: 14/928,931

(22) Filed: Oct. 30, 2015

(65) Prior Publication Data

US 2016/0122020 A1 May 5, 2016

Related U.S. Application Data

(60) Provisional application No. 62/073,390, filed on Oct. 31, 2014.

(51) Int. Cl.
| | |
|---|---|
| *B64D 11/00* | (2006.01) |
| *B64D 11/02* | (2006.01) |
| *B64D 11/04* | (2006.01) |
| *B64F 5/00* | (2006.01) |

(52) U.S. Cl.
CPC ............... *B64D 11/00* (2013.01); *B64D 11/02* (2013.01); *B64D 11/04* (2013.01); *B64F 5/0009* (2013.01); *B64D 2011/0046* (2013.01); *Y10T 29/49826* (2015.01); *Y10T 29/49904* (2015.01); *Y10T 29/49947* (2015.01); *Y10T 29/49948* (2015.01); *Y10T 29/49963* (2015.01)

(58) Field of Classification Search
CPC ....... B64D 11/00; B64D 11/02; B64D 11/04; B64D 2011/0046; B64F 5/0009; Y10T 29/49826; Y10T 29/49904; Y10T 29/49948; Y10T 29/49963; Y10T 29/49947
See application file for complete search history.

(56) References Cited

U.S. PATENT DOCUMENTS

| | | | |
|---|---|---|---|
| 4,000,870 A | 1/1977 | Davies | |
| 4,185,799 A | 1/1980 | Richards, Jr. | |
| 5,083,727 A | 1/1992 | Pompei | |
| 6,007,025 A | 12/1999 | Coughren | |
| 2010/0116933 A1 | 5/2010 | Erickson | |
| 2012/0248245 A1 | 10/2012 | Schliwa | |
| 2015/0034355 A1* | 2/2015 | Patton | F24J 2/5245 174/78 |

OTHER PUBLICATIONS

Interational Search Report and Written Opinion issued in PCT/US2015/058450 on Jan. 21, 2016.

* cited by examiner

*Primary Examiner* — John C Hong (74) *Attorney, Agent, or Firm* — Jeffer Mangels; Butler & Mitchell LLP; Brennan C. Swain, Esq.

(57) ABSTRACT

A method of positioning a monument within an aircraft. The method includes positioning first and second tracks having first and second carriages thereon on the floor. The first and second carriages are initially in a first position. The method includes positioning a floor of a first monument section with a first fitting on the carriage of the first track, positioning a floor of a second monument section with a second fitting on the carriage of the second track, moving the first and second monument sections with the carriages to a second position, aligning the first fittings with a connection point on the aircraft floor, raising the floors of the first and second monument sections and removing the first and second tracks, lowering the floors of the first and second monument sections, securing the first and second fittings to the connection points associated therewith.

19 Claims, 6 Drawing Sheets

INSTALLATION SYSTEM FOR AFT AIRCRAFT MONUMENT ASSEMBLY

CROSS REFERENCE TO RELATED APPLICATIONS

This application claims the benefit of U.S. Provisional Application No. 62/073,390, filed Oct. 31, 2014 which is herein incorporated by reference in its entirety.

FIELD OF THE INVENTION

The present invention relates generally to a system for installing an aircraft monument assembly.

BACKGROUND OF THE INVENTION

Aircraft monuments can be difficult to install inside of an aircraft, particularly in the aft area of an aircraft where the monument spans the entire width of the aircraft, making it difficult to get therebehind during installation. Accordingly, a need exists for a system for installing a monument.

SUMMARY OF THE PREFERRED EMBODIMENTS

In accordance with a first aspect of the present invention there is provided a method of positioning a monument within an aircraft having a floor that includes a plurality of connection points. The method includes (a) positioning at least first and second tracks on the aircraft floor. The first and second tracks have a forward end and an aft end and the first track includes at least a first carriage thereon that is movable longitudinally therealong, and the second track includes at least a second carriage thereon that is movable longitudinally therealong. The first and second carriages are initially in a first position. The method also includes (b) positioning a floor of a first monument section having at least a first fitting with an opening therein on the first carriage, (c) positioning a floor of a second monument section having at least a second fitting with an opening therein on the second carriage, (d) moving the first and second monument sections together with the carriages, such that the carriages move along the first and second tracks from the first position to a second position, (e) aligning the first fittings with a connection point on the aircraft floor, (f) raising the floor of the first monument section and removing the first track, (g) raising the floor of the second monument section and removing the second track, (h) lowering the floor of the first monument section, (i) lowering the floor of the second monument section, (j) securing the first fitting to the connection point associated therewith, and (k) securing the second fitting to the connection point associated therewith.

In a preferred embodiment, the method includes the step of positioning the forward ends of the first and second tracks a first axial distance from a forward most connection point. In a preferred embodiment, after step (b), the first monument section is assembled and after step (c) the second monument section is assembled. In another preferred embodiment, prior to step (b), the first monument section is assembled and the second monument section is assembled. In a preferred embodiment, after step (b), the first fitting is secured to the first carriage. In a preferred embodiment, a threaded fastener is inserted through the opening in the first fitting and threaded into an opening in the first carriage.

The first monument section preferably includes at least one electrical or plumbing interface, and, prior to step (d), the method includes the step of connecting the at least one electrical or plumbing interface of the first monument section with a corresponding interface associated with the aircraft. The second monument section also preferably includes at least one electrical or plumbing interface, and, prior to step (d), the method includes the step of connecting the at least one electrical or plumbing interface of the second monument section with a corresponding interface associated with the aircraft.

In a preferred embodiment, step (e) includes loosely securing a threaded fastener through the opening in the first fitting and into a connection point. Preferably, step (f) is done using a jack and step (g) is performed by screwing a riser into an opening in a fitting in the floor of the second monument section until a bottom of the riser contacts the aircraft floor and then continuing to screw the riser into the opening until the floor of the second monument section is raised off the aircraft floor.

In a preferred embodiment the method includes positioning a third track on the aircraft floor. The third track includes at least a third carriage thereon that is movable longitudinally therealong. Initially, the third carriage is in a first position. The method also includes positioning a floor of a third monument section on the carriage of the third track. The floor includes at least a third fitting having an opening therein. The method also includes connecting the second monument section to the third monument section, moving the first, second and third monument sections together with the carriages, such that the carriages move along the first, second and third tracks from the first position to a second position, aligning the first fittings with a connection point on the aircraft floor, raising the floor of the third monument section and removing the third track, lowering the floor of the third monument section, and securing the third fitting to the connection point associated therewith. In a preferred embodiment, the first monument section is a galley monument section and the second monument section is a lavatory monument section. In a preferred embodiment, the first monument section is a galley monument section, the second monument section is a lavatory monument section, and the third monument section is a lavatory monument section. Preferably, the riser includes a bushing, spacer and tool interface.

In accordance with another aspect of the present invention, there is provided a kit used in a method of positioning an aircraft monument assembly that includes at least first and second monument sections. The kit includes a first track that includes a forward end and an aft end and at least a first carriage thereon that is movable longitudinally therealong. The first carriage includes at least one threaded opening therein. The kit also includes a second track that includes a forward end and an aft end and at least a second carriage thereon that is movable longitudinally therealong. The second carriage includes at least one threaded opening therein. The kit also includes at least a first riser having a top, a bottom and a threaded exterior diameter. The top includes a tool interface.

In a preferred embodiment, the first riser includes a bushing and a spacer. The bushing includes the threaded exterior diameter and an opening in a bottom thereof. The spacer includes a curved bottom surface and a post extending upwardly therefrom. The post is received in the opening in the bottom of the bushing.

The present invention described herein and shown in the attached drawings can be used to install or mount monuments such as those disclosed in U.S. Patent Publication Nos. 2014/0319275 and 2014/0291446, both of which are incorporated by reference herein in their entireties.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-8 show an embodiment of a system 11 for installing a monument assembly 10 in the interior of an aircraft. In particular, the invention can be used on commercial passenger aircraft. However, this is not a limitation on the present invention and the system 11 can be used elsewhere. In a preferred embodiment, the system 11 is used to install a monument assembly 10 that includes first, second and third monument sections 13*a*, 13*b* and 13*c* in the aft portion of an aircraft. However, this is not a limitation on the present invention. In an exemplary embodiment, the first monument section is a galley unit and the second and third monument sections are lavatory units. In another embodiment, the two lavatories can be combined in to a single monument section.

The publications listed above in the Summary of the Preferred Embodiments section describe monuments that are positioned in the aft portion of an aircraft 100 (shown in FIGS. 1-3) (e.g., an Airbus A320 or A321). The present invention shown in FIGS. 1-8 is a system 11 and related components for installing the monument assembly 10 and other similar monuments. When installing such a monument assembly 10 it is difficult for personnel to attach electrical, plumbing and other interfaces after it is positioned in its final destination (see FIG. 3). The system 11 provides the ability to assemble the different components/units of the monument while on rails/tracks at a position forward of the final destination and then slide the monument assembly 10 aft into position.

In a preferred embodiment, the system includes a plurality of guide rails or tracks 12 with carriages 14 and at least one and preferably two or more risers 16. Four tracks 12 are shown in the drawings however as few as two can be used. More than two can also be used. Each track 12 includes at least one and preferably two carriages 14 and at least one carriage stop 18 to prevent the carriages 14 from sliding off the guide rails or tracks 12. Each riser 16 includes a bushing 20, spacer 22 and tool interface/lug 24 (e.g., for using a wrench or other tool).

It will be appreciated that a typical aircraft includes hard points 40 to which monuments can be mounted. Fittings 26 are installed on the floors 28a, 28b and 28c of the monument assembly 10 that will ultimately be connected to the hard points 40 on the floor of the aircraft. The fittings 26 include openings therein through which threaded fasteners can be inserted to connect the monument assembly 10 to the floor of the aircraft 100. The carriages 14 include openings that line up with the fittings in the floor of at least the first monument section and can receive threaded fasteners.

Figure 1:
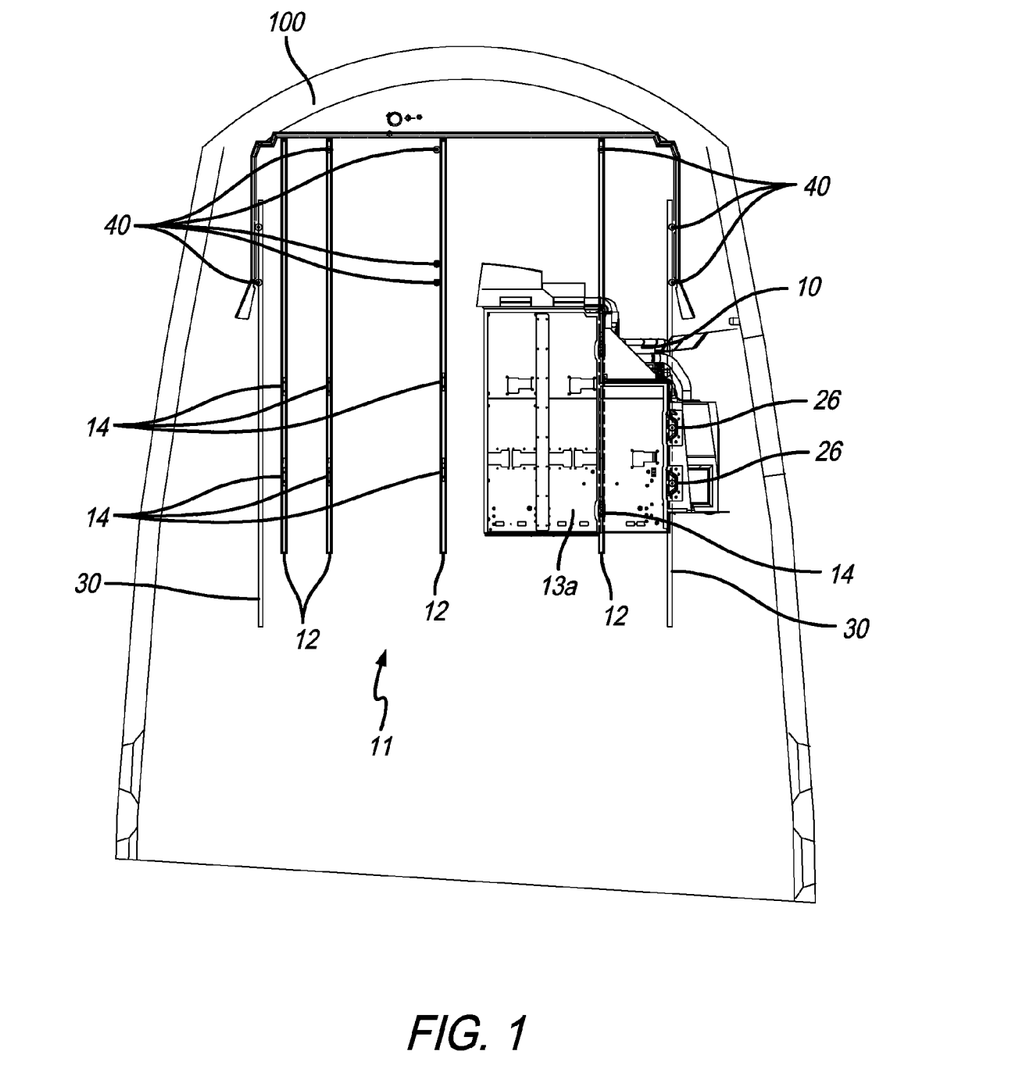
FIG. 1 is a plan view of the aft portion of an aircraft and the components of the installation system described herein together with the first monument section in a first position in accordance with a preferred embodiment of the present invention.
Figure 2:
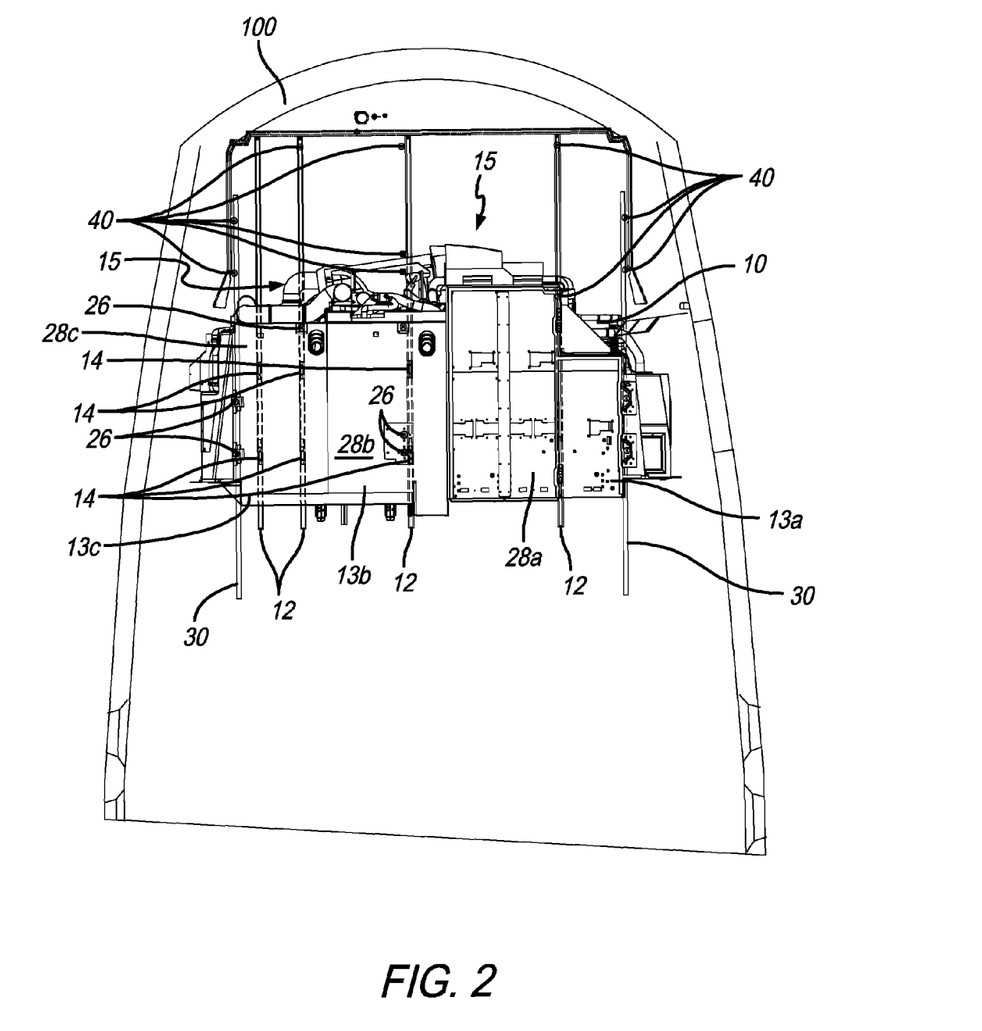
FIG. 2 is another plan view of the aft portion of an aircraft and the components of the installation system together with the first, second and third monument sections in the first position.
Figure 3:
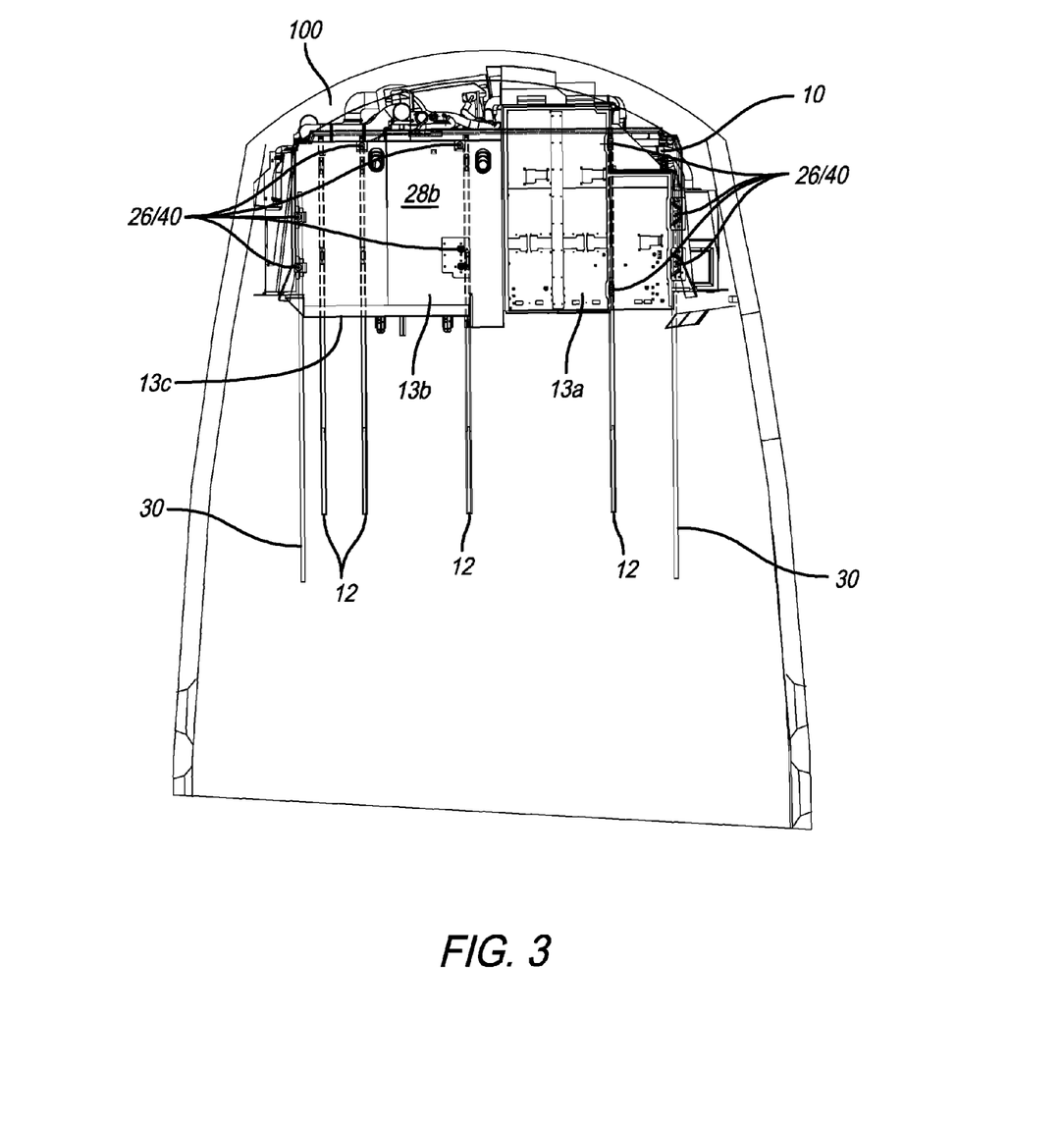
FIG. 3 is another plan view of the aft portion of an aircraft and the components of the installation system together with the first, second and third monument sections in the second position.
Figure 4:
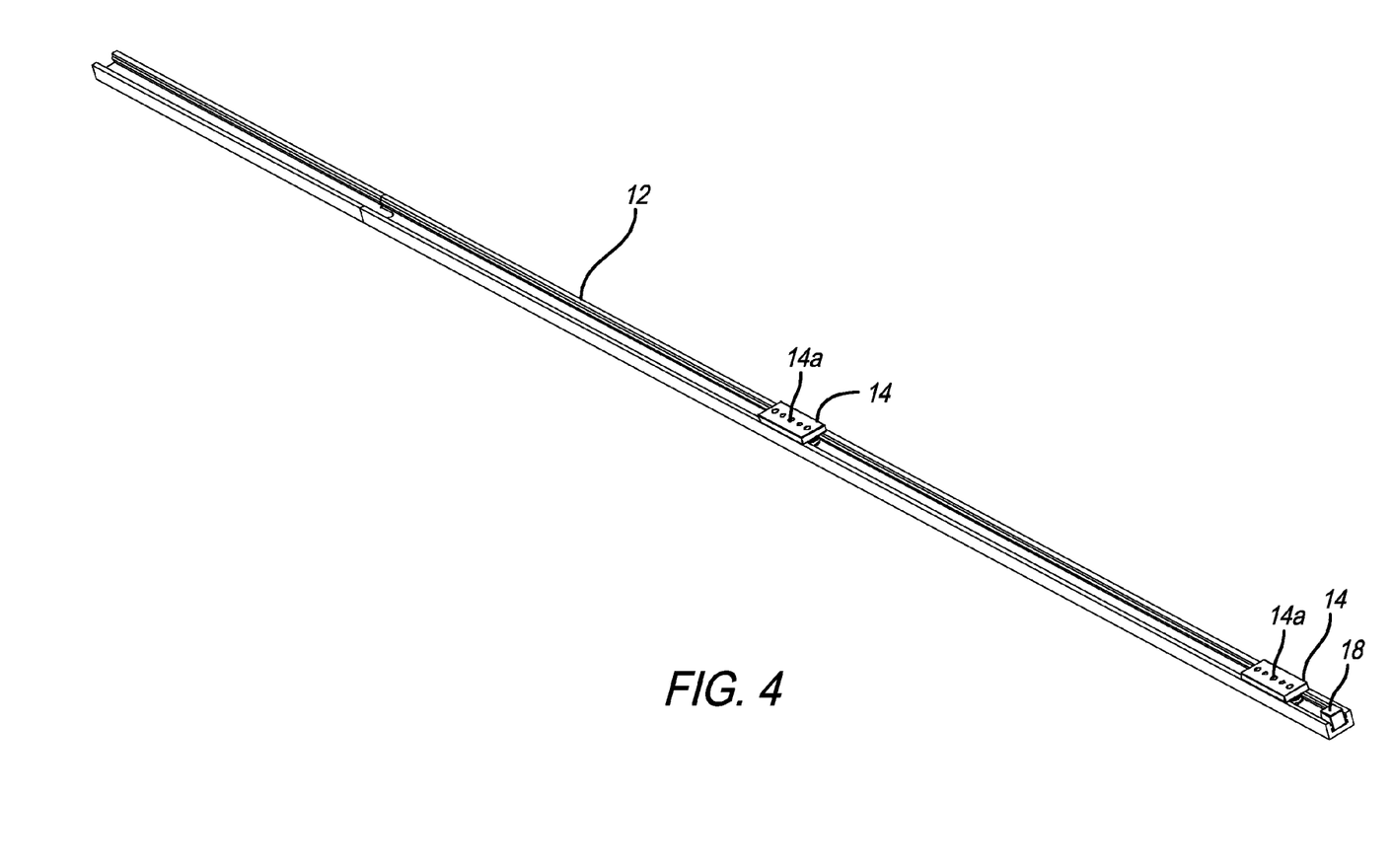
FIG. 4 is a perspective view of a track from the installation system of FIG. 1 with the carriages thereon.
Figure 5:
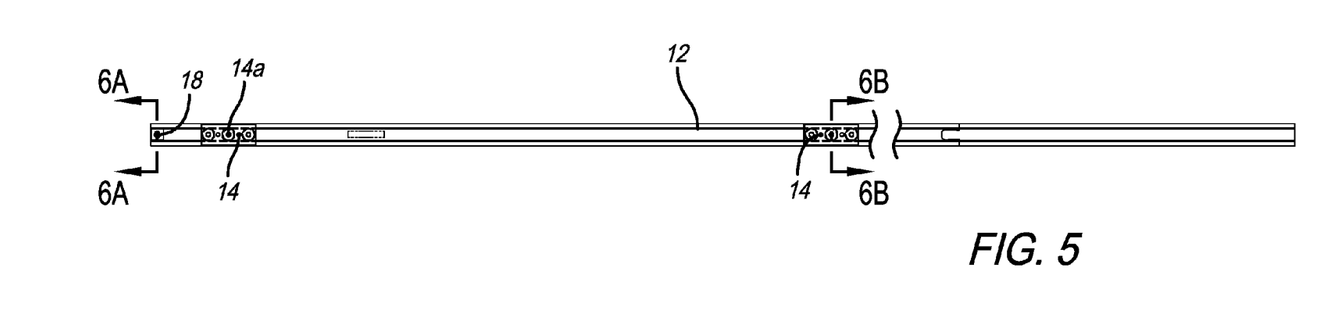
FIG. 5 is a top plan view of a track from the installation system of FIG. 1 with the carriages thereon.
Figure 6A:
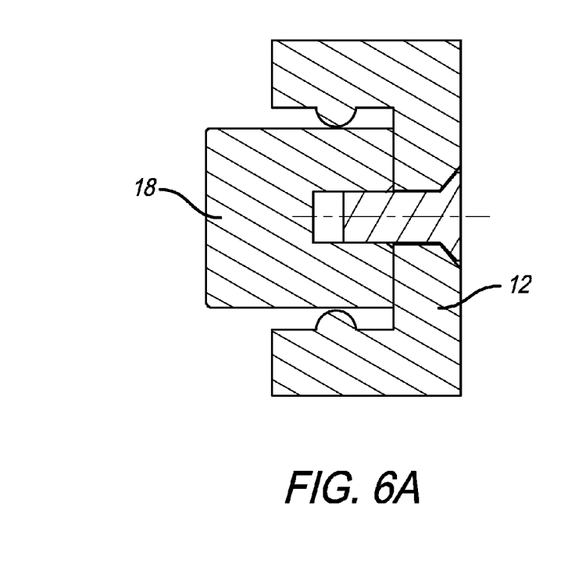
FIG. 6A is a cross-section taken along line 6A-6A of FIG. 5.
Figure 6B:
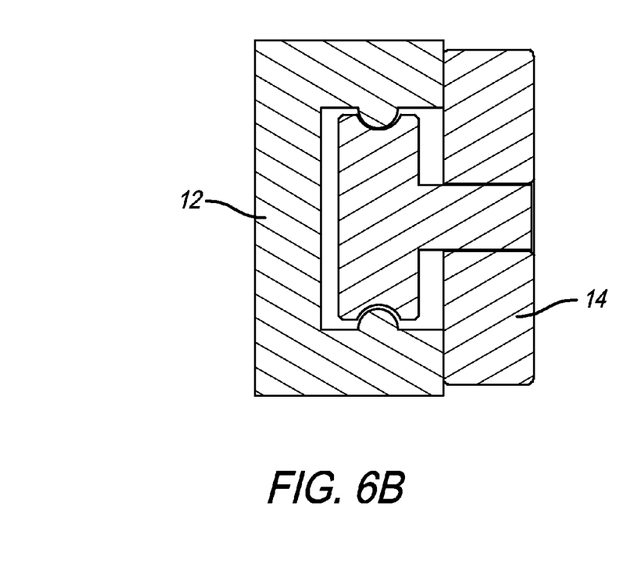
FIG. 6B is a cross-section taken along line 6B-6B of FIG. 5.
Figure 7:
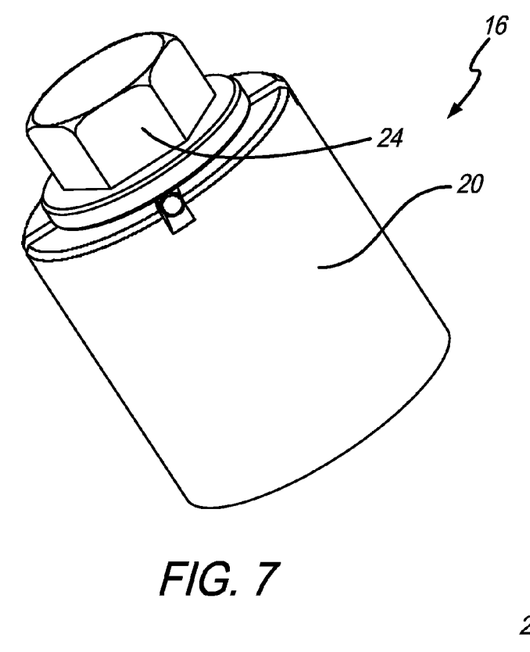
FIG. 7 is a perspective view of a riser from the installation system of FIG. 1.
Figure 8:
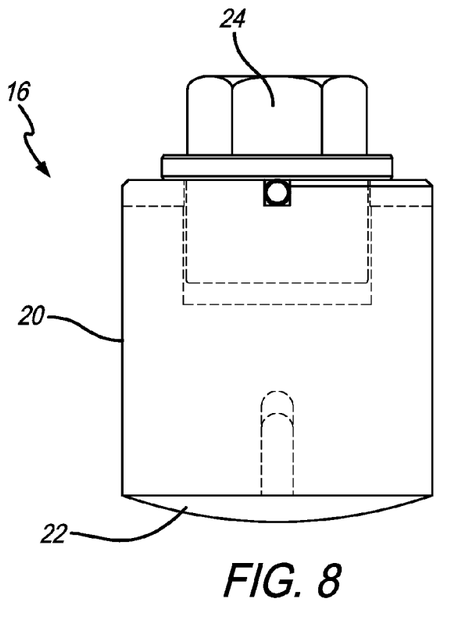
FIG. 8 is an elevational view of the riser.

With reference to FIGS. 1-3, the steps in an exemplary embodiment of the invention for installing a monument are presented. It will be appreciated that the number and order of the steps is only exemplary and can be modified as desired. With reference first to FIG. 1, in a preferred embodiment, the steps for installing a monument assembly 10 are as follows: First, position the four tracks 12 on the aircraft floor as shown in FIG. 1. Next, using the right-side outboard hard points 40 as a datum, place longitudinally extending tape 30 on the aircraft floor as shown in FIG. 1. Tape 30 can also be placed on the left outboard side in line with the hard points 40. The tape is used to show were the hard points are located so that the tracks 12 can be aligned properly. Next, position the front end of the tracks 12 at a first distance (e.g., approximately 60 inches) from the forward outboard hard point 40. Next, position the floor 28a of the first monument section 13a on the first track 12 and associated carriage(s) 14. The first monument section 13a can then be assembled. In another embodiment, the first monument section 13a is assembled before placing it on the track(s) 12. Next, the first monument section 13a can be secured to the carriages 14 thereunder by positioning the carriages 14 under the fittings 26 in the floor 28 and then inserting threaded fasteners through the fittings 26 and threading them into threaded openings 14a in the carriages 14.

With reference to FIG. 2, the floor 28b of the middle or second monument section 13b is positioned on a second track 12 (and the associated carriage(s) 14). The second monument section 13b is then assembled. In another embodiment, the second monument section 13b can be assembled before placing it on the track(s) 12. The carriages 14 do not have to be secured to the floor 28b of the second monument section 13b. However, they can be if desired. Next, the floor 28c of the third monument section 13c is positioned on the third and fourth tracks 12 (and the associated carriage(s) 14). In another embodiment a single track can be used. The third monument section 13c is then assembled. In another embodiment, the third monument section 13c can be assembled before placing it on the track(s) 12. The carriages 14 do not have to be secured to the floor 28c of the third monument section 13c. However, they can be if desired. Next, the second and third monument sections 13b and 13c are connected. This can be done with threaded fasteners or the like.

Next, all of the interfaces 15 (e.g., electrical, plumbing, etc.) of the monument assembly 10 are connected to the aircraft 100 interfaces. The entire monument assembly 100 and carriages 14 are now moved aft via the tracks 12 until the monument assembly 100 is positioned as desired. The fittings 26 are then each aligned with a hard point 40 on the aircraft floor. This can be done by loosely securing floor fitting bolts through the fittings 26 and into the hard points 40 in one or more locations.

With reference to FIG. 3, the first monument section 13a is then raised high enough so that it is above the tracks 12. 14. The raising of the first monument section 13a can be done using a hydraulic jack or the like. In an exemplary embodiment, the first monument section 13a is a galley monument section. The jack can be used on the galley monument section because there is space where the drink carts are placed during use.

Next, a threaded riser 16 is threaded into the aft outboard fitting 26 (or any other fitting 26) to raise the second and third monument sections 13b and 13c above the track. This is done by screwing the riser 16 into the fitting 26 until the spacer 22 (or bottom of the riser 16) contacts the aircraft floor and then continuing to screw the riser 16 in (because the outside of the bushing 20/riser 16 is threaded), thereby raising the second and third monument sections 13b and 13c. Further threaded risers 16 can be used (e.g., FIG. 3 shows two locations). It will be understood that the first, second and third monument sections 13a, 13b and 13c are raised or lifted high enough to free the tracks 12 underneath the monument assembly 10.

Once the tracks 12 are removed, the monument assembly 10 is lowered until the floors 28a, 28b and 28c are on the aircraft floor. This can be done by lowering the hydraulic jack and/or unscrewing the riser(s) 16. After the monument assembly 10 is completely lowered, the risers 16 (and jack) are removed and the monument assembly 10 is attached to the aircraft at the hard points 40 (via threaded fasteners through the fittings 26).

It will be appreciated that steps can be combined, omitted or performed in a different order. Generally, the present invention provides the ability to assemble the monument assembly and connect interfaces at a position forward in the aircraft from its final destination and then move the entire assembled monument assembly aft into the desired position.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above detailed description of the preferred embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A method of positioning a monument within an aircraft having a floor that includes a plurality of connection points, the method comprising the steps of:
   (a) positioning at least first and second tracks on the aircraft floor, wherein the first and second tracks have a forward end and an aft end, wherein the first track includes at least a first carriage thereon that is movable longitudinally therealong, wherein the second track includes at least a second carriage thereon that is movable longitudinally therealong, wherein the first and second carriages are initially in a first position,
   (b) positioning a floor of a first monument section on the first carriage, wherein the floor includes at least a first fitting having an opening therein,
   (c) positioning a floor of a second monument section on the carriage of the second track, wherein the floor includes at least a second fitting having an opening therein,
   (d) moving the first and second monument sections together with the carriages, whereby the carriages move along the first and second tracks from the first position to a second position,
   (e) aligning the first fittings with a connection point on the aircraft floor,
   (f) raising the floor of the first monument section and removing the first track,
   (g) raising the floor of the second monument section and removing the second track,
   (h) lowering the floor of the first monument section,
   (i) lowering the floor of the second monument section,
   (j) securing the first fitting to the connection point associated therewith, and
   (k) securing the second fitting to the connection point associated therewith.

2. The method of claim 1 wherein the method includes the step of positioning the forward ends of the first and second tracks a first axial distance from a forward most connection point.

3. The method of claim 1 wherein after step (b) the first monument section is assembled.

4. The method of claim 3 wherein after step (c) the second monument section is assembled.

5. The method of claim 1 wherein prior to step (b) the first monument section is assembled.

6. The method of claim 5 wherein prior to step (c) the second monument section is assembled.

7. The method of claim 1 wherein after step (b) the first fitting is secured to the first carriage.

8. The method of claim 7 wherein a threaded fastener is inserted through the opening in the first fitting and threaded into an opening in the first carriage.

9. The method of claim 1 wherein the first monument section includes at least one electrical or plumbing interface, and wherein prior to step (d) the method includes the step of connecting the at least one electrical or plumbing interface of the first monument section with a corresponding interface associated with the aircraft.

10. The method of claim 9 wherein the second monument section includes at least one electrical or plumbing interface, and wherein prior to step (d) the method includes the step of connecting the at least one electrical or plumbing interface of the second monument section with a corresponding interface associated with the aircraft.

11. The method of claim 1 wherein step (e) includes loosely securing a threaded fastener through the opening in the first fitting and into a connection point.

12. The method of claim 1 wherein step (f) is done using a jack.

13. The method of claim 1 wherein step (g) is performed by screwing a riser into an opening in a fitting in the floor of the second monument section until a bottom of the riser contacts the aircraft floor and then continuing to screw the riser into the opening until the floor of the second monument section is raised off the aircraft floor.

14. The method of claim 13 wherein the riser comprises a bushing, spacer and tool interface.

15. The method of claim 1 further comprising
   positioning a third track on the aircraft floor, wherein the third track includes at least a third carriage thereon that is movable longitudinally therealong, wherein the third carriage is initially in a first position,
   positioning a floor of a third monument section on the carriage of the third track, wherein the floor includes at least a third fitting having an opening therein, connecting the second monument section to the third monument section, moving the first, second and third monument sections together with the carriages, whereby the carriages move along the first, second and third tracks from the first position to a second position, aligning the first fittings with a connection point on the aircraft floor, raising the floor of the third monument section and removing the third track, lowering the floor of the third monument section, and securing the third fitting to the connection point associated therewith.

16. The method of claim 15 wherein the first monument section is a galley monument section, the second monument section is a lavatory monument section, and the third monument section is a lavatory monument section.

17. The method of claim 1 wherein the first monument section is a galley monument section and the second monument section is a lavatory monument section.

18. A method of positioning a monument within an aircraft having a floor that includes a plurality of connection points, the method comprising the steps of:

(a) positioning at least first, second and third tracks on the aircraft floor, wherein the first, second and third tracks have a forward end and an aft end, wherein the first track includes at least a first carriage thereon that is movable longitudinally therealong, wherein the second track includes at least a second carriage thereon that is movable longitudinally therealong, wherein the third track includes at least a third carriage thereon that is movable longitudinally therealong, wherein the first, second and third carriages are initially in a first position, (b) positioning a floor of a first monument section on the carriage of the first track, wherein the floor includes at least a first fitting having an opening therein, wherein the first monument section includes at least one electrical or plumbing interface, (c) securing the first fitting to the first carriage, (d) positioning a floor of a second monument section on the carriage of the second track, wherein the floor includes at least a second fitting having an opening therein, wherein the second monument section includes at least one electrical or plumbing interface, (e) positioning a floor of a third monument section on the carriage of the third track, wherein the floor includes at least a third fitting having an opening therein, wherein the third monument section includes at least one electrical or plumbing interface, (f) connecting the at least one electrical or plumbing interface of the first monument section with a corresponding interface associated with the aircraft, (g) connecting the at least one electrical or plumbing interface of the second monument section with a corresponding interface associated with the aircraft, (h) connecting the at least one electrical or plumbing interface of the third monument section with a corresponding interface associated with the aircraft, (i) connecting the second and third monument sections, (j) moving the first and second monument sections together with the carriages, whereby the carriages move along the first and second tracks from the first position to a second position, (k) aligning the first fittings with a connection point on the aircraft floor, (l) raising the floor of the first monument section using a jack and removing the first track, (m) raising the floor of the second monument section by screwing a riser into an opening in a fitting in the floor of one of the second or third monument sections until a bottom of the riser contacts the aircraft floor and then continuing to screw the riser into the opening until the floor of the second and third monument sections is raised off the aircraft floor, (n) removing the second and third tracks, (o) lowering the floor of the first monument section, (p) lowering the floors of the second and third monument sections, (q) securing the first fitting to the connection point associated therewith, (r) securing the second fitting to the connection point associated therewith, and (s) securing the third fitting to the connection point associated therewith.

19. A kit used in a method of positioning an aircraft monument assembly that includes at least first and second monument sections, the kit comprising:

a first track that includes a forward end and an aft end, wherein the first track includes at least a first carriage thereon that is movable longitudinally therealong, wherein the first carriage includes at least one threaded opening therein, a second track that includes a forward end and an aft end, wherein the second track includes at least a second carriage thereon that is movable longitudinally therealong, wherein the second carriage includes at least one threaded opening therein, and at least a first riser that includes a top, a bottom and a threaded exterior diameter, wherein the top includes a tool interface, wherein the first riser includes a bushing and a spacer, wherein the bushing includes the threaded exterior diameter and an opening in a bottom thereof, wherein the spacer includes a curved bottom surface and a post extending upwardly therefrom, and wherein the post is received in the opening in the bottom of the bushing.

* * * * *